United States Patent [19]
Milana et al.

[11] Patent Number: 5,841,542
[45] Date of Patent: Nov. 24, 1998

[54] OPTO-ELECTRONIC MEASURING APPARATUS FOR CHECKING LINEAR DIMENSIONS

[75] Inventors: Emilio Milana, Pontecchio Marconi; Giovanni Graziani, Ozzano Emilia, both of Italy

[73] Assignee: Marposs Societa' Per Azioni, Bentivoglio, Italy

[21] Appl. No.: 930,761
[22] PCT Filed: Apr. 2, 1996
[86] PCT No.: PCT/EP96/01444
  § 371 Date: Oct. 7, 1997
  § 102(e) Date: Oct. 7, 1997
[87] PCT Pub. No.: WO96/32624
  PCT Pub. Date: Oct. 17, 1996

[30] Foreign Application Priority Data

Apr. 13, 1995 [IT] Italy .................. B095A0162

[51] Int. Cl.$^6$ .................................. G01B 11/08
[52] U.S. Cl. ............... 356/384; 356/386; 250/559.24
[58] Field of Search ................... 356/376, 384, 356/385, 386, 387; 250/559.06, 559.19, 559.22, 559.24

[56] References Cited

U.S. PATENT DOCUMENTS

| | | | |
|---|---|---|---|
| 4,013,367 | 3/1977 | Nagao et al. | 356/200 |
| 4,576,482 | 3/1986 | Pryor | 356/384 |
| 4,753,532 | 6/1988 | Aldred | 356/384 |
| 4,785,193 | 11/1988 | Dassler et al. | 250/560 |
| 5,114,230 | 5/1992 | Pryor | 256/384 |
| 5,291,272 | 3/1994 | Demirsu | 356/384 |

FOREIGN PATENT DOCUMENTS

| | | |
|---|---|---|
| 25 21 037 | 11/1975 | Germany . |
| 3521260 A1 | 12/1986 | Germany . |
| 2 030 286 | 4/1980 | United Kingdom . |
| 2 077 912 | 12/1981 | United Kingdom . |
| WO 86/05583 | 9/1986 | WIPO . |

OTHER PUBLICATIONS

See 1 in Addendum.

English language translation of International Publication No. WO 86/05583.

*Primary Examiner*—Hoa Q Pham
*Attorney, Agent, or Firm*—Dickstein Shapiro Morin & Oshinsky LLP.

[57] ABSTRACT

An apparatus for checking linear dimensions of a workpiece (10) according to the shadow casting technique, including a bed (1), a first support structure (5, 6) sustained by the bed for supporting the workpiece, a second support structure (4), optical sources (22–25) coupled to the second support structure (4) for generating associated beams of light, a plurality of linear photosensitive devices (26–29) coupled to the second support structure (4) for receiving the beams of light after they have been intercepted by the workpiece, and detecting circuits (20, 21) connected to the photosensitive devices (26–29). The optical sources (22–25) are arranged in two units (22, 23; 24, 25) at opposite sides with respect to the workpiece, and the photosensitive devices (26–29) are also arranged in two units (26, 27; 28, 29) located at opposite sides with respect to the workpiece. Two optical beam splitters (30, 31) coupled to the second support structure (4) partially reflect the beams of light emitted by the optical sources and generate two sections of beams of light directed in opposite directions, that fall on the workpiece and reach the photosensitive devices (26–29). The photosensitive devices are substantially arranged in a same transversal plane.

15 Claims, 6 Drawing Sheets

OPTO-ELECTRONIC MEASURING APPARATUS FOR CHECKING LINEAR DIMENSIONS

TECHNICAL FIELD

The present invention relates to an opto-electronic measuring apparatus for checking geometric features of a workpiece according to the shadow casting technique, including a first support, defining a supporting location for the workpiece, a second support, coupled with the first support, with two portions oppositely arranged with respect to said supporting location, a first generating system for generating optical radiations for providing a first beam of light with a section directed towards the workpiece, a first photosensitive linear system coupled to one of the two oppositely arranged portions for receiving said first beam after it is intercepted by the workpiece, a second generating system for generating optical radiations for providing a second beam of light with a section directed towards the workpiece, a second photosensitive linear system for receiving said second beam after it is intercepted by the workpiece and detecting and control circuits connected to the first and the second photosensitive linear system and adapted to receive the signals from the first and the second photosensitive linear system and to combine said signals for achieving a measurement of the workpiece in a single cross-section.

BACKGROUND ART

Various types of opto-electronic devices for checking the geometric features of workpieces are well known. These devices are based on various principles, among which the <<shadow casting>> technique.

Fundamentally, a shadow casting device comprises an emitter unit emitting a beam of light and directing it towards a workpiece, arranged at a prefixed position. The workpiece partially intercepts, depending on its dimensions, the beam. The non-intercepted portion of the beam reaches a detector-processor unit that detects the portion of the beam and, by means of electronic processings, calculates the dimensions of the workpiece, or its deviation with respect to a nominal value.

Among the shadow casting measuring apparatuses, those for measuring, in an absolute and flexible way, diameters and axial distances of rotationally symmetrical workpieces, as rings, hubs and elongate workpieces, like shafts, are particularly important. The term flexibility for similar apparatuses means, for example, the possibility of measuring workpieces with even considerably different nominal dimensions, workpieces with portions having dimensions, as the diameters thereof, differing, or workpieces of different types, without there being the need to modify the structure of the apparatus. For these purposes, it is necessary that the opto-electronic system cover a broad measuring range. Since the opto-electronic components available on the market, in particular the detecting devices, such as the devices with linear arrays of photodiodes, "CCD" ("Charge Coupled Devices") arrays, or similar ones, cover relatively small measuring ranges, it is necessary to envisage solutions enabling to broaden the range of a single component. In this connection, it is necessary to bear in mind that if several detecting devices are arranged aligned, one after the other, the resulting measuring range is discontinuous, as there are zones, corresponding to the passage from one device to the following one, that do not overlap.

A first solution foresees the use (in the case of diameter checking) of just two detecting devices, precision positioning slides for displacing the elements of the opto-electronic apparatus and measuring systems for accurately measuring the slide displacements. A similar solution, adopted in the measuring apparatus disclosed in European patent application EP-A0216587, is subject to drawbacks due to the difficulty of performing and measuring to a high degree of accuracy the displacements of the elements of the opto-electronic system and to the lengthy measuring cycles.

Another solution, according to the apparatus disclosed in U.S. Pat. No. 4,854,707, foresees the use of two rows of emitters and two rows of detectors, oppositely arranged with respect to the workpiece axis. The two rows of emitters and similarly the two rows of detectors are arranged one beside the other in a longitudinal direction and the single emitters and detectors are staggered in the transversal measuring direction, so as to substantially multiply the measuring range of a single emitter-detector couple. The expedient of misaligning the rows of emitters and detectors gives rise to the disadvantage whereby the individual measuring ranges substantially lie along two parallel lines, at a prefixed distance from each other. Thus, it may be necessary to reciprocally displace the opto-electronic system and the workpiece along the workpiece axis. Even though, normally, there is foreseen the use of a slide and a device for measuring the position of the slide when checking a plurality of dimensions at different cross-sections of the workpiece, the aligning of the workpiece cross-section with the row of emitters and the associated row of detectors gives rise to inconveniences owing to the measuring cycle times, possible hunting movements and complications in the electronic processing.

In UK patent application GB-A-2030286, an apparatus is disclosed for measuring the contour configuration of articles having a circular or elliptical cross-section.

The article to be measured is placed on an indexing turntable and is simultaneously checked at three different cross-sections by three independent opto-electronic measuring systems, each including a projecting member comprising a laser light source and a rotating mirror, for reflecting the laser light beam and providing, during a period T, a scanning beam, and a light receiving member. Projecting members and receiving members are arranged at opposite sides of the turntable. Data about the contour of the object are obtained by detecting the duration of the output signal from the light receiving members.

DISCLOSURE OF THE INVENTION

Object of the present invention is to provide an apparatus including emitters and detectors arranged in two rows, but overcoming the limitations of the apparatus disclosed in U.S. Pat. No. 4,854,707.

This is achieved by an opto-electronic measuring apparatus for checking geometric features of a workpiece according to the shadow casting technique, including a first support, defining a supporting location for the workpiece, a second support, coupled with the first support, with two portions oppositely arranged with respect to said supporting location, a first generating system for generating optical radiations for providing a first beam of light with a section directed towards the workpiece, a first photosensitive linear system coupled to one of the two oppositely arranged portions for receiving said first beam after it is intercepted by the workpiece, a second generating system for generating optical radiations for providing a second beam of light with a section directed towards the workpiece, a second photosensitive linear system for receiving said second beam after it is intercepted by the workpiece and detecting and control circuits connected to the first and the second photosensitive linear system and adapted to receive the signals from the first and the second photosensitive linear system and to combine said signals for achieving a measurement of the workpiece in a single cross-section, wherein the second generating system for generating optical radiations is adapted for providing the second beam of light with a section directed towards the workpiece, in an opposite direction with respect to that of the section of the first beam of light, and wherein there are foreseen two beam splitter devices, each of the devices being connected to one of said oppositely arranged portions and being adapted to receive both one and the other of said first and second beam and to partially divert one of the beams towards the relevant photosensitive linear system, the second photosensitive linear system being coupled to the other of the two oppositely arranged portions, the two aforementioned beam splitter devices being located between the first and the second photosensitive linear system and said supporting location.

The invention enables to achieve an apparatus with a virtual linear array of detectors covering, in a continuous way, a broad measuring range.

Hence, it is possible to achieve a higher degree of measurement accuracy and repeatability, and to reduce the measurement times, the amount of mechanical movements, and the complexity of the software.

BRIEF DESCRIPTION OF THE DRAWINGS

The invention is now described in detail for illustrative and non limiting purposes with reference to the enclosed sheets of drawings, wherein.

BEST MODES FOR CARRYING OUT THE INVENTION

Figure 1:
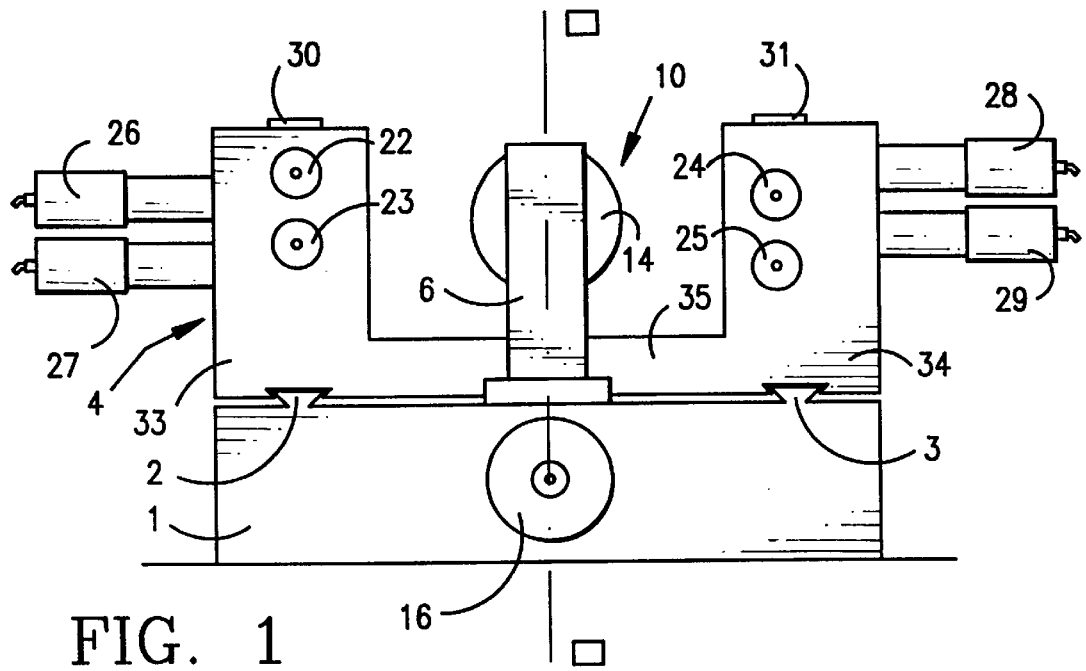
FIG. 1 is a schematic front view of an apparatus for measuring diameters, lengths, ovality, concentricity, etc.

In the following description there are shown two embodiments of the invention, the first, as referred to FIGS. 1, 2, 3, 4, for checking workpieces featuring rotational symmetry and the second, more suitable for workpieces featuring asymmetry about the rotation axis, like for example crankshafts, with reference to FIGS. 5, 6, 7.

The apparatus according to the first embodiment shown in FIGS. 1–4 comprises a bed 1, with two guides 2, 3, for example dovetail-shaped, whereto there is coupled a longitudinal slide 4, substantially U-shaped with two oppositely arranged portions or stanchions 33, 34, for supporting the main component parts of the opto electronic measuring system.

On bed 1 there are mounted two supports 5, 6 for supporting a live center 7, driven to rotate by a motor 8, and a dead center 9, respectively. Live center 7 and dead center 9 support the workpiece to be measured consisting, in the example shown in FIGS. 1 and 2, of a shaft 10 with two end portions 11, 12 having identical nominal diameter and two intermediate portions 13, 14 with different nominal diameters. Support 5, with motor 8, and support 6 are mounted on a longitudinal guide 15 in an adjustable way for enabling live center 7 and dead center 9 to support workpieces of different length.

Figure 3:
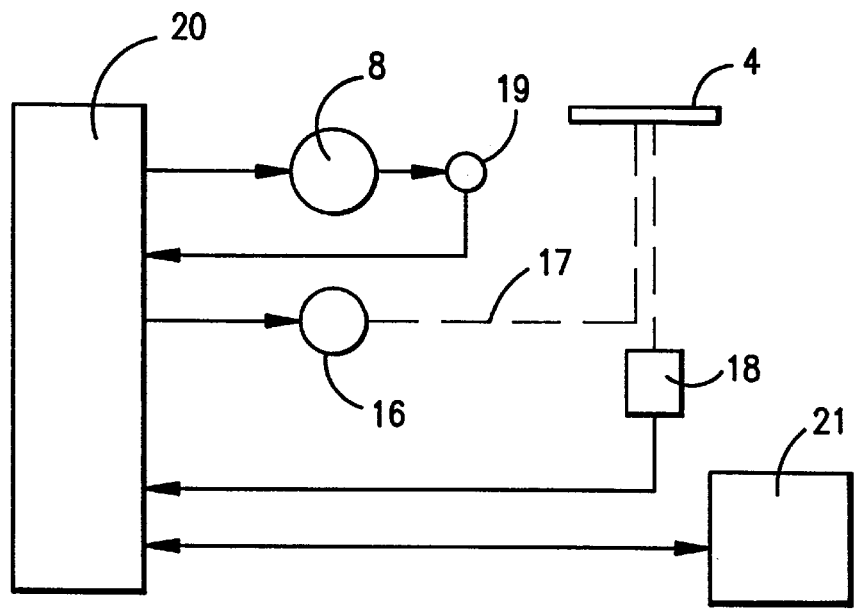
FIG. 3 is a simplified diagram of the driving and processing devices of the apparatus shown in FIGS. 1 and 2.

The longitudinal slide 4 can be displaced along guides 2, 3, in the direction defined by the geometrical axis of live center 7 and dead center 9, in other words according to the direction of the geometrical axis of workpiece 10 when the latter is positioned in the supporting location, by means of a driving system comprising a motor 16 and mechanical coupling devices, schematically shown with a dashed line 17 in FIG. 3. Between slide 4 and bed 1 there is mounted a linear position transducer 18 (see FIG. 3), for providing a signal responsive to the position of the slide 4. A measuring system 19, for example a rotary transducer, or "encoder", providing signals depending on the rotation of live center 7, and thus of workpiece 10, is also associated to motor 8.

An electric cabinet 20 contains circuits and devices for the power supply, control, processing, display and printing. The circuits of cabinet 20 are connected to motors 8, and 16, to the measuring transducers 18 and 19 and to other elements of the opto-electronic measuring system, marked by identification number 21 in FIG. 3.

Figure 2:
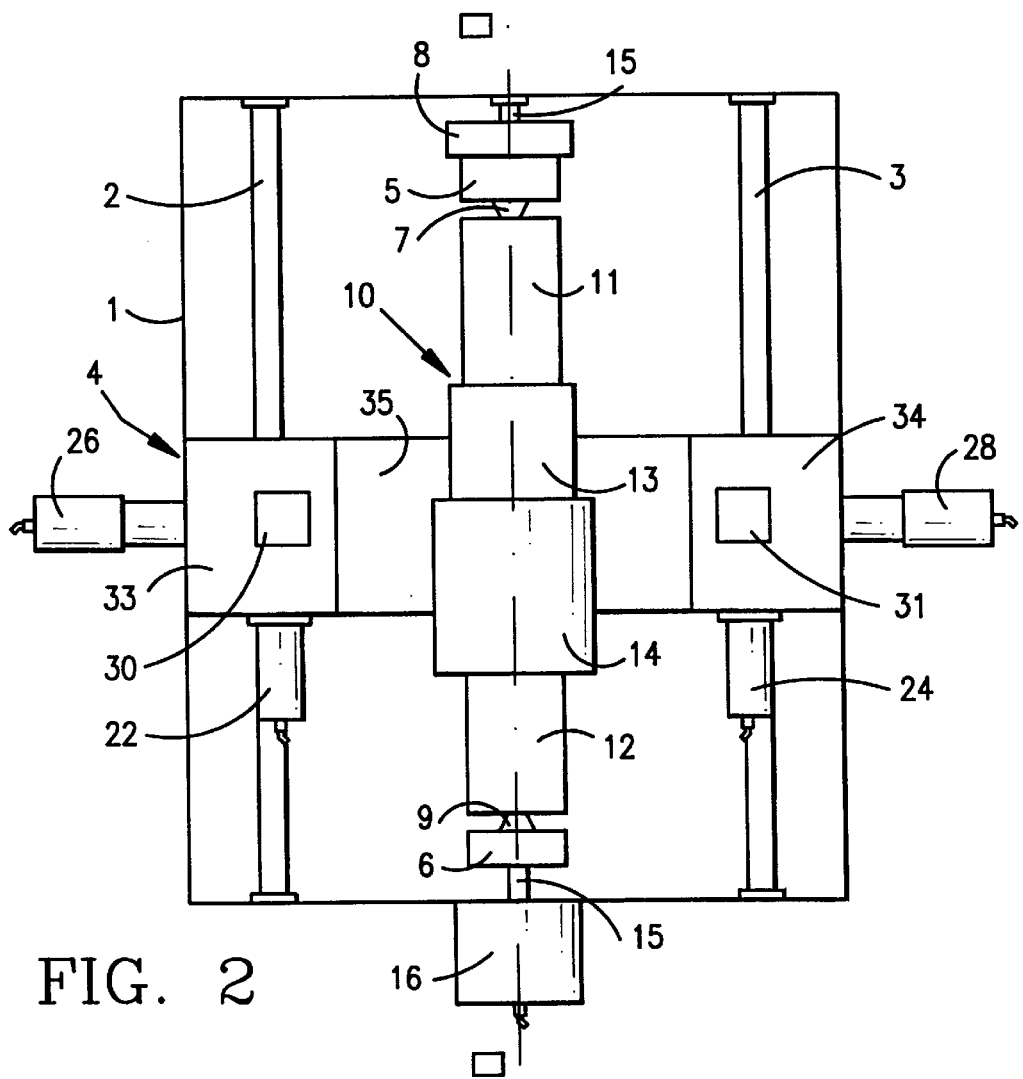
FIG. 2 is a plan view of the apparatus shown in FIG. 1.
Figure 4:
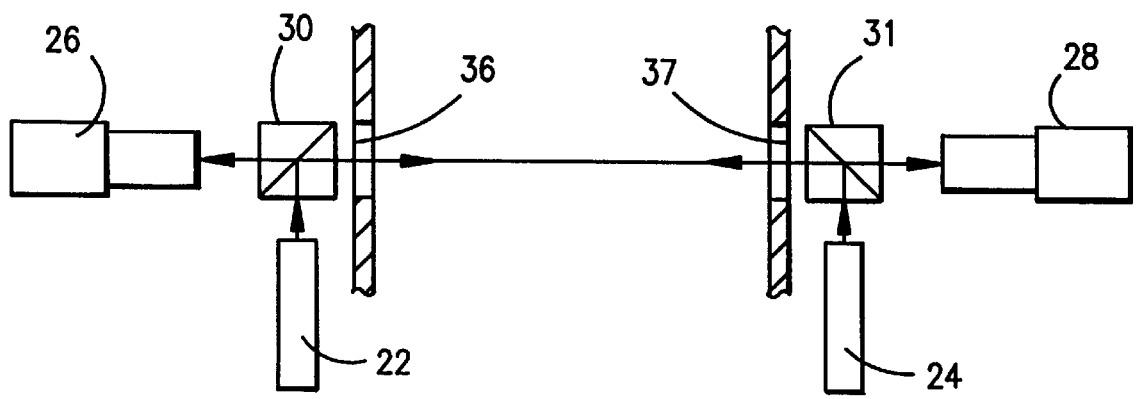
FIG. 4 is a tentative outline of the opto-electronic measuring system of the apparatus shown in FIGS. 1 to 3.
Figure 5:
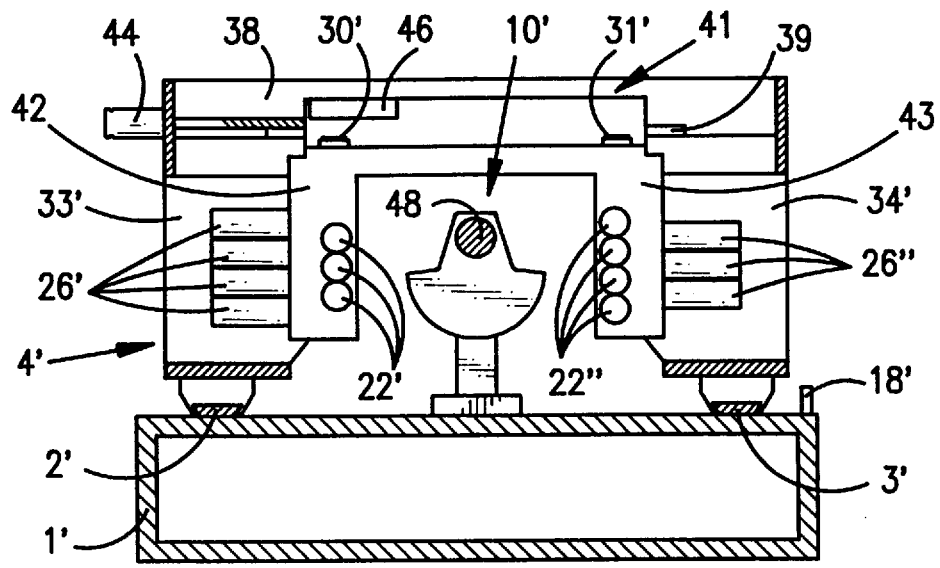
FIG. 5 is a schematic cross-sectional view of an apparatus according to a second embodiment.

With reference to FIGS. 1, 2 and 4, the opto-electronic measuring system 21 comprises four emitter devices, or optical radiation generators, or optical sources 22, 23, 24 and 25, four receiver devices, or photosensitive devices 26, 27, 28 and 29 and two prisms, or beam splitters 30 and 31, coupled to the two stanchions, 33 and 34 of slide 4. The two stanchions 33, 34 are stiffly coupled to each other by means of a base plate 35 of slide 4.

The emitter devices 22–25 are arranged in the longitudinal direction of the apparatus, i.e. in the direction defined by guides 2, 3 and 15, or by live center 7 and dead center 9, while the receiver devices 26–29 are arranged in a transversal direction, perpendicular to the longitudinal one.

The emitter devices 22 and 23, the receiver devices 26 and 27 and the beam splitter 30 are coupled to stanchion 33, while the emitter devices 24 and 25, the receiver devices 28 and 29 and the beam splitter 31 are coupled to stanchion 34. In substance, the optical sources are grouped in two sub-systems, or units, 22, 23; 24, 25 and in the same way the photosensitive devices are grouped in two corresponding sub-systems, or units, 28, 29; 26, 27.

As shown in FIG. 1, the emitter devices 22–25 and the receiver devices 26–29 are staggered in a direction (the vertical direction in FIG. 1) perpendicular to the longitudinal one and to the hereinbefore described transversal one. The geometric axis of emitter 22 and that, perpendicular to it, of receiver 28 lie in a plane perpendicular to that of FIG. 1; similarly, the geometric axes of emitter 24 and of receiver 26 lie in a second plane, parallel to the first, the geometric axes of emitter 23 and of receiver 29 lie in a third plane, parallel to the second, and the geometric axes of emitter 25 and of receiver 27 lie in a fourth plane, parallel to the third. The distance existing between the first and the second plane is identical to that existing between the second and the third plane and to that between the third and the fourth plane. Furthermore, the geometric axes of the emitters 22 and 23 and of the emitters 24 and 25, respectively, lie in two parallel planes (perpendicular to the four aforementioned planes), staggered in the transversal direction. On the contrary, the geometric axes of receivers 26–29 lie in an identical transversal (vertical) plane.

The beam of light emitted by emitter 22 is directed in a longitudinal direction, hence it falls on beam splitter 30. Half of the light beam is reflected by the diagonal plane of the splitter prism 30, in the transversal direction, while the other half of the light is transmitted and kept unused. The reflected light, by passing through a window 36 of stanchion 33, travels (from left to right in FIG. 4) for a section of path towards the workpiece (not shown in FIG. 4) and then, further to a possible interception by the workpiece, travels through a window 37 of stanchion 34 and reaches beam splitter 31. At the diagonal plane of the latter, the reflected part of the light, equal to half of the incident beam, is not utilized, while the transmitted light reaches receiver 28.

In the same way there occurs the transmission from emitter 23 to receiver 29. The beam of light emitted by emitter 24 is directed in a longitudinal direction, hence it falls on beam splitter 31. Half of the light beam is reflected by the diagonal plane of prism 31 in a transversal direction, while the other half of the light is transmitted and kept unused. The reflected light, by passing through window 37 of stanchion 34, travels for a section of path (from right to left in FIG. 4) towards the workpiece and then, further to a possible interception by the workpiece, travels through window 36 and reaches beam splitter 30. At the diagonal plane of the latter, the reflected part of the light, equal to half of the incident beam, is not utilized, while the transmitted light reaches receiver 26. In the same manner there occurs the transmission from emitter 25 to receiver 27.

The distances separating each of the emitter-receiver couples in the vertical direction (with reference to FIG. 1) are such that the associated measuring ranges are substantially summed. More specifically, there are summed the measuring ranges of receivers 26–29, that, in a vertical direction, are adjacent according to the order 28–26–29–27 (from the top downwards—in FIG. 1). In substance, there is created a virtual linear array of four receivers.

By identifying as the "object plane" of the opto-electronic system the longitudinal plane of symmetry, shown in FIGS. 1 and 2 by path O—O, one notices that the optical sources 22–25 are arranged parallel with respect to the object plane and are divided in two units oppositely located with respect to the object plane, while the photosensitive devices 26–29, perpendicularly arranged with respect to the object plane, are also located at opposite sides with respect to the object plane and their geometric axes lie in a transversal cross section plane perpendicular with respect to the object plane.

It is also possible to invert the arrangement of the components of the opto-electronic measuring system 21, so that the photosensitive devices 26–29 are arranged parallel with respect to the object plane O—O and are divided in two units oppositely located with respect to the object plane, while the optical sources 22–25 are arranged perpendicularly to the object plane and their geometric axes lie in the above mentioned cross-section plane. In such case, half of the beam of light emitted by each of the emitters 22–25 and transmitted through the relevant beam splitter 30 (or 31), travels for a section of path towards the workpiece and then, further to a possible interception by the workpiece, travels to the other beam splitter 31 (or 30). At the diagonal plane of the latter, the reflected part of light, i.e. half of the incident beam, reaches the relevant receiver 26–29.

As a preference, the emitters are of the infrared diode type and the receivers are of the CCD type.

A CCD array can cover, for example, a 22 mm measuring range. With four emitter-receiver couples, it is possible to obtain, according to the invention, a continuous range of approximately 82 mm (with a 2 mm overlap for each couple of adjacent receivers). Obviously, the number of emitter-receiver couples can increase (or diminish) according to requirements. For example, seven couples provide a 142 mm measuring range. A limitation to the number of couples depends on the maximum possible length that the beam splitter devices (prisms) can reach, consistently with the machining tolerances set by the required measurement accuracy.

A second embodiment, shown in FIGS. 5–8, is particularly suitable for checking workpieces featuring asymmetry about a rotation axis such as, for example, a crankshaft 10' comprising main journals 47, defining a rotation axis for the crankshaft and crankpins 48, defining eccentric geometric axes, parallel to the rotation axis and spaced apart from it. The apparatus comprises a bed 1', with two guides 2', 3', for example dovetail-shaped, whereto there is coupled a longitudinal slide 4', substantially bridge-shaped, comprising two columns 33', 34' and an upper plate 38 with two transversal guides 39, 40 whereto there is coupled a transversal slide 41, substantially U-shaped, defining two stanchions 42, 43 for supporting the main component parts of an opto-electronic measuring system marked by identification number 21' in FIG. 9. The opto-electronic measuring system 21' comprises seven emitter devices, or optical radiation generators, or optical sources 22', 22", seven receiver devices, or photosensitive devices 26', 26" and two prisms, or beam splitters 30' and 31', coupled to the two stanchions 42, 43 of slide 41. The arrangement of the opto-electronic measuring system 21' on the two stanchions 42, 43 of the transversal slide 41, is substantially identical to the arrangement of the opto-electronic measuring system 21 of the first embodiment on the two columns 33, 34 of the longitudinal slide 4 shown in FIGS. 1–4. The operating principle of the opto-electronic measuring system 21', is substantially the same as the one of the system 21 as disclosed with reference to the first embodiment.

The workpiece supporting means are substantially equal to those described for the first embodiment with reference to FIGS. 1 and 2. On bed 1' there are mounted two supports 5', 6' for supporting a live center 7', driven to rotate by a motor 8', and a dead center 9', respectively. Live center 7' and dead center 9' support the crankshaft 10' to be measured. Support 6' is mounted on a longitudinal guide 15' in an adjustable way for enabling live center 7' and dead center 9' to support workpieces of different length.

Figure 9:
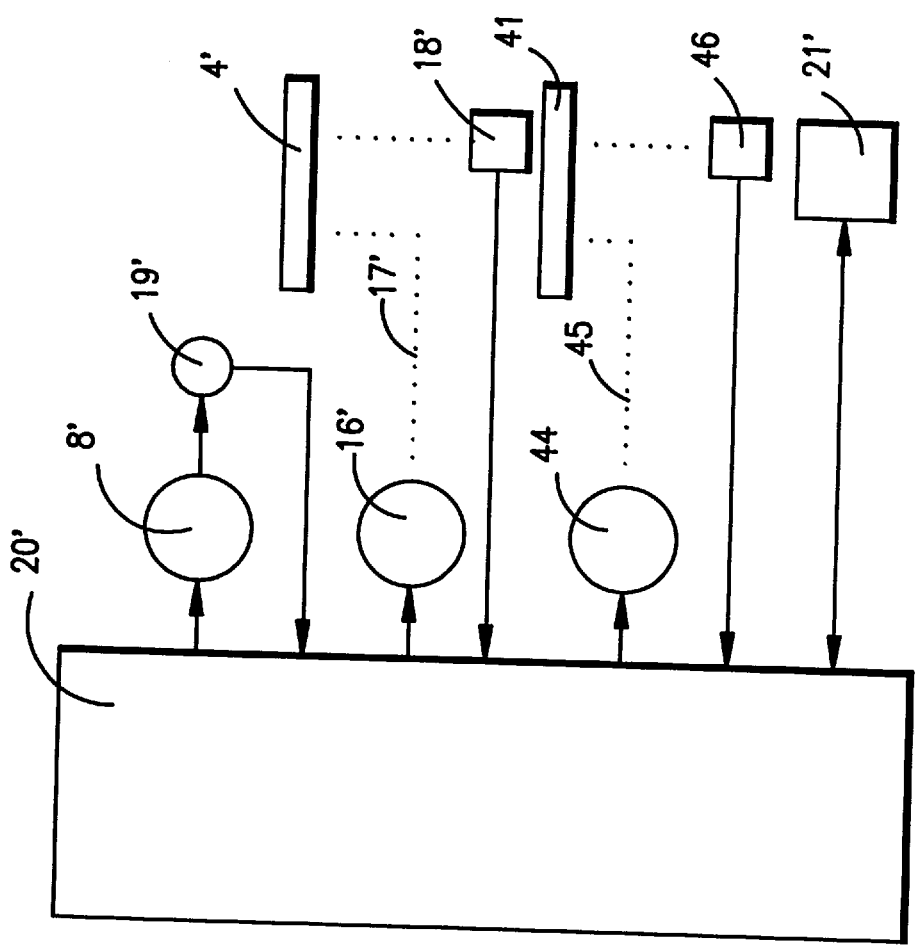
FIG. 9 is a simplified diagram of the driving and processing devices of the apparatus shown in FIGS. 5–8.

The longitudinal slide 4' can be displaced along guides 2', 3', in the direction defined by the geometrical axis of live center 7' and dead center 9', in other words according to the direction of the rotation axis of the crankshaft 10', when the latter is positioned in the supporting location, by means of a driving system comprising a motor 16' and mechanical coupling devices, schematically shown with a dashed line 17' in FIG. 9. Between slide 4' and bed 1' there is mounted a linear position transducer 18', for providing a signal responsive to the position of the slide 4'. A measuring system 19', for example a rotary transducer, or "encoder", providing signals depending on the rotation of live center 7', and thus of workpiece 10', is also associated to motor 8'.

The transversal slide 41 can be displaced along the guides 39, 40 in a transversal direction, parallel to the direction of the light beams, by means of a driving system comprising a motor 44 and mechanical coupling devices schematically shown with a dashed line 45 in FIG. 9. The position of the transversal slide 41 is detected by a linear position transducer 46.

An electric cabinet 20' contains circuits and devices for the power supply, control, processing, display and printing. The circuits of cabinet 20' are connected to motors 8', 16' and 44, to the measuring transducers 18', 19' and 46 and to the other elements of the opto-electronic measuring system 21'.

The opto-electronic measuring system 21' has a rather high but however limited depth of field, depending on the characteristics of the optical devices. When the surfaces of the workpiece being checked are outside the space corresponding to the depth of field, i.e. far from a substantially central transversal zone between the stanchions 42, 43 carrying the opto-electronic measuring system 21', the reliability of the apparatus is no more assured, because the misfocusing may cause appreciable errors. With reference to a crankshaft 10', or other workpieces featuring asymmetry about the rotation axis, when particular features are controlled like, for example, the roundness of a crankpin 48, by checking diametral dimensions of the crankpin 48 in correspondence of different angular positions of the workpiece about the rotation axis, the transversal arrangement of the surface of the checked crankpin 48, with reference to the workpiece rotation axis, changes, when the angular position of the crankshaft 10' changes.

The movement of the transversal slide 41, for this and other hereinafter described checkings, enables to keep the stanchions 42, 43 and consequently the optical system 21' in a symmetric position with reference to the surfaces of the crankpin being checked.

On the basis, for example, of memorized data, concerning the crankshaft 10' nominal dimensions, other nominal features and the angular position of the crankshaft 10', provided by encoder 19', control and processing circuits contained in electric cabinet 20' drive motor 44 to displace the transversal slide depending on the angular position of the crankshaft 10'.

Two among possible checking operations that can be carried out with an apparatus according to the invention, are briefly described hereinbelow.

A first checking operation relates to the mutual angular arrangement (or "index") of the crankpins 48, 48', 48" around the rotation axis.

Each of the crankpins 48, 48', 48" defines a radial plane, including its eccentric axis and the rotation axis of the crankshaft 10'. The radial plane of a datum crankpin 48 (e. g. the crankpin adjacent to the main journal 47) is chosen as angular reference.

Motor 8' is controlled by the control circuits of cabinet 20' to drive a rotation of the crankshaft 10' about the rotation axis, to a rough position where the radial plane of the datum crankpin 48 is approximately perpendicular to the direction of the light beams directed towards the workpiece and to the rotation axis of the crankshaft 10'. This position is achieved on the basis of memorised data, concerning the nominal features of the crankshaft 10'. A precise reference position of the datum crankpin 48 (position represented in FIG. 5) is achieved as follows. A rotational movement of the crankshaft 10' of a limited angle about the above-mentioned rough position is controlled through motor 8' and, during such rotational movement, the position of the surface of the datum crankpin is checked by means of the opto-electronic measuring system 21'. The angular arrangement, detected by encoder 19' and corresponding to the maximum distance of the checked surface from the rotation axis (maximum height of the upper edge of the shadow of crankpin 48, according to FIG. 5), is taken as the angular reference position.

Figure 6:
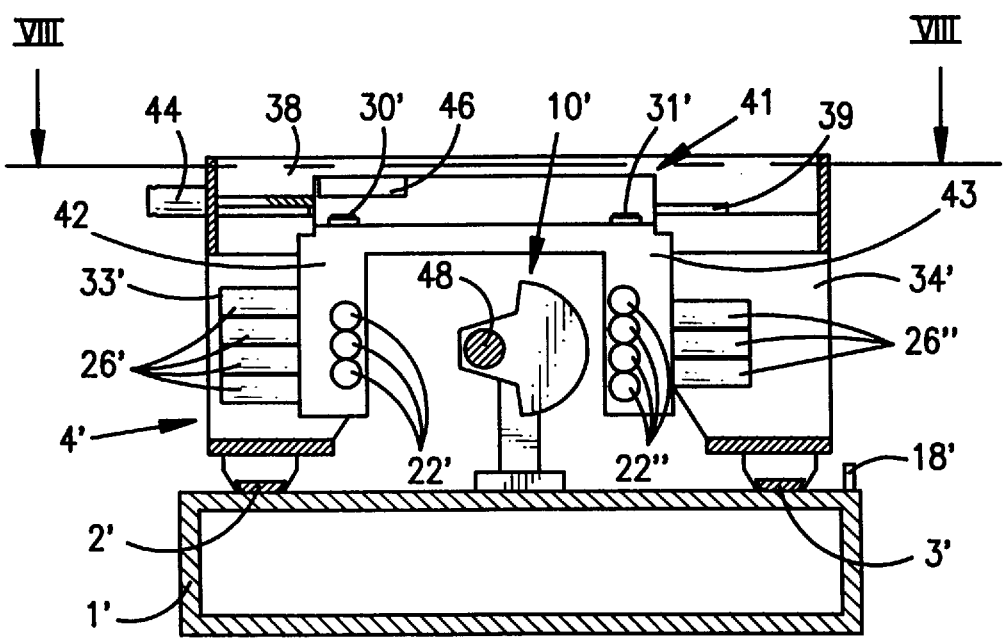
FIG. 6 is a cross-sectional view of the apparatus of FIG. 5, according to path VI—VI of FIG. 8, in which the workpiece to be checked is shown in a different angular position with respect to FIG. 5.
Figure 7:
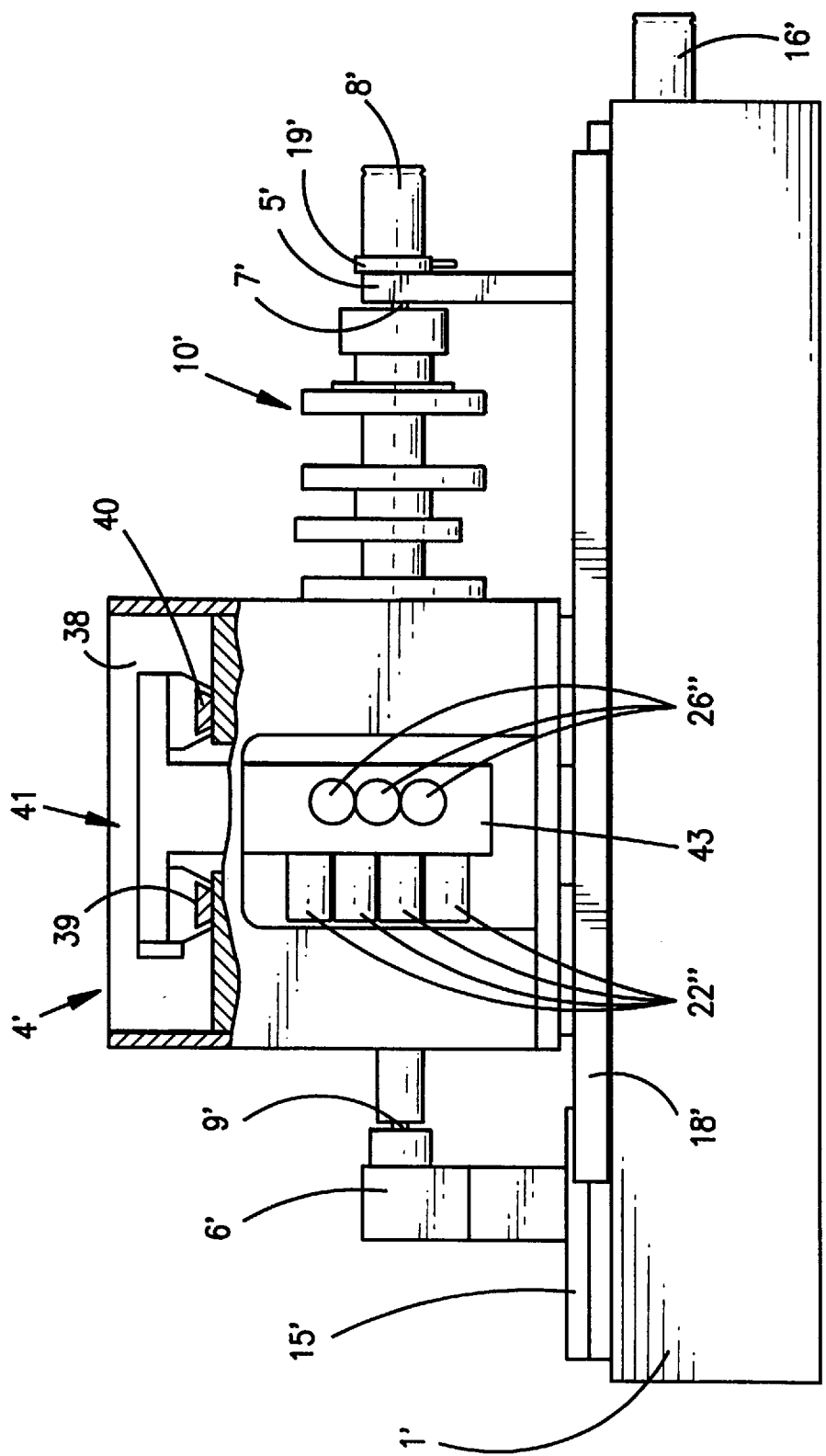
FIG. 7 is a lateral, partially cross-sectioned, view of the apparatus shown in FIGS. 5 and 6.

Motor 8' is then controlled, on the basis of signals from encoder 19', to drive a 90° rotation of the crankshaft 10' about the rotation axis, to the position represented in FIG. 6.

In this position the aforementioned radial plane of the datum crankpin 48 is parallel to the direction of the light beams, directed towards the workpiece, and to the rotation axis.

Figure 8:
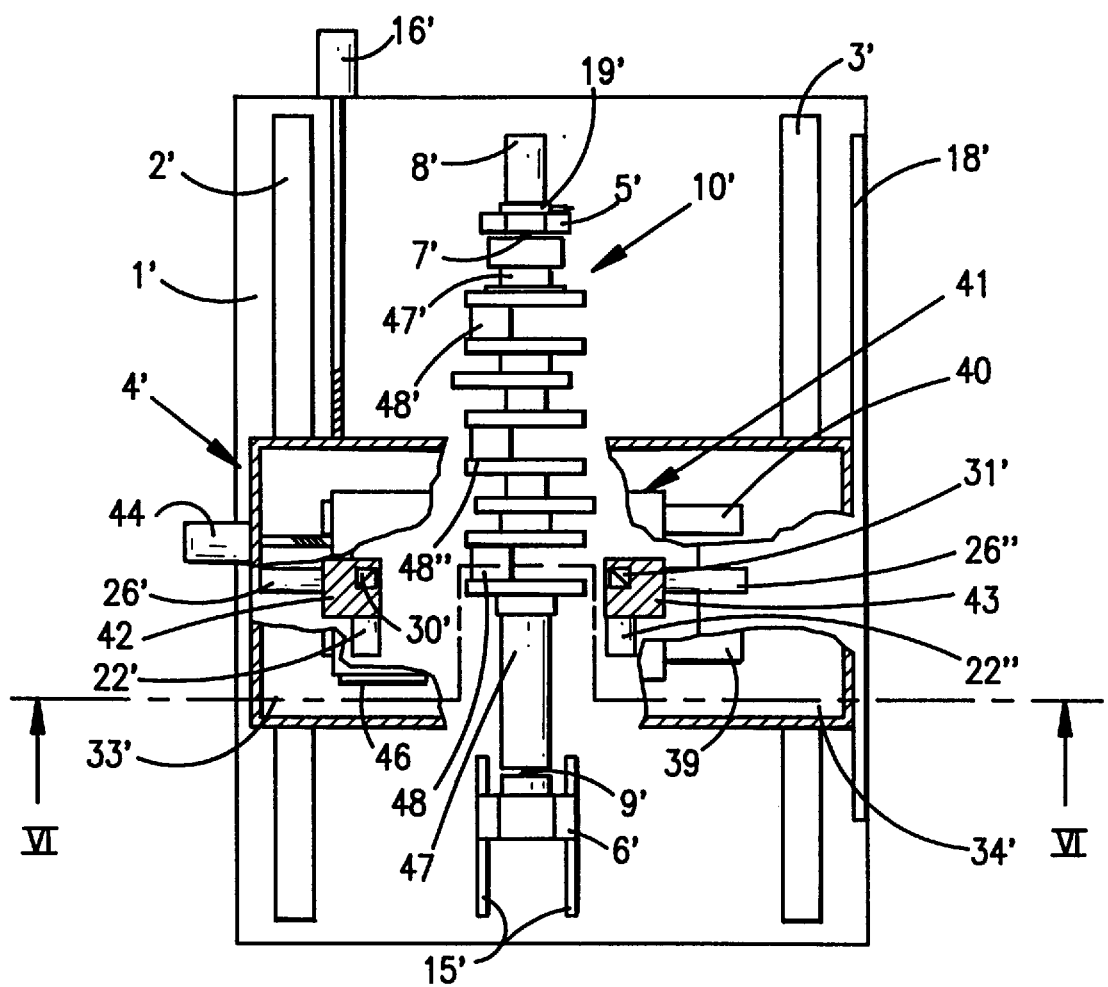
FIG. 8 is a cross sectional view of the apparatus of FIGS. 5–7 according to path VIII—VIII in FIG. 6.

When this position is reached, the control circuits of electric cabinet 20' drive motor 44 to carry the transversal slide with the two stanchions 42, 43 and consequently the opto-electronic measuring system 21', in a transversally symmetric position as referred to the datum crankpin 48 axis, as shown in FIG. 8. A value relevant to the position of the geometrical axis of the datum crankpin 48, along the direction in which the photosensitive devices 26' are arranged, (vertical direction of FIG. 6) is detected.

Motor 8' is then controlled, by the control circuits of electric cabinet 20', on the basis of the signals from encoder 19', to drive a rotation of the crankshaft 10' about the rotation axis, of an angle corresponding to the nominal angular arrangement of the crankpin 48' to be checked with respect to the datum crankpin 48.

When this position is reached, the control circuits in electric cabinet 20' drive motor 16' to displace the longitudinal slide 4' to carry the two stanchions 42, 43 in correspondence of the crankpin 48' to be checked. A value relevant to the position of the axis of the crankpin 48' along the direction in which the photosensitive devices 26' are arranged is detected by means of the opto-electronic system 21'.

The difference between the above determined values is indicative of the deviation of the mutual angular arrangement between crankpin 48 and 48' from the nominal "index".

This operation is repeated for all the other crankpins.

A second checking relates to the radial distance of the eccentric geometrical axis of a crankpin 48 from the rotation axis of the crankshaft 10' (or "throw") and substantially includes the following steps. At first, the position of the rotation axis along the alignment direction of the photosensitive devices 26' is determined: values relevant to the positions of the axes of the main journals 47, 47' are detected by means of the opto-electronic measuring system 21' (in correspondence of two different positions of the longitudinal slide 4') and properly processed in a known way, to obtain a value indicative of the position of the rotation axis. Motor 8' is then controlled by the control means of cabinet 20' to drive a rotation of the crankshaft 10' about the rotation axis, to a rough position where the radial plane of the crankpin 48, the throw of which is to be checked, is approximately perpendicular to the direction of the light beams, directed towards the workpiece and motor 16' is controlled to drive the longitudinal slide 4' and the opto-electronic measuring system 21' in correspondence of the crankpin 48 to be checked (position substantially corresponding to the one of FIG. 5). A precise reference position of the crankpin 48 is then achieved as described above with reference to the "index" checking and the datum crankpin 48.

In such precise reference position, a value relevant to the position of the eccentric axis of crankpin 48, along the alignment direction of the photosensitive devices 26', is detected by means of the opto-electronic measuring system 21'.

The difference between the values relevant to the positions respectively of the eccentric axis and of the rotation axis, along such alignment direction, is indicative of the value of the "throw".

The same procedure is repeated for all the other crankpins.

In the above described embodiments, the two beam splitters have been manufactured with two prisms. This solution has been chosen because it guarantees more precise mechanical coupling and doesn't require high precision positioning. The function performed by the prisms 30, 31; 30', 31' may also be obtained with a lamina or with a film, having particular optical features and property.

It should be realized that the quality of the beam splitter prisms 30, 31; 30', 31' and the angular arrangement for their coupling are important. In any case, the described embodiments can be manufactured by using components available on the market and do not need extremely accurate mechanical couplings.

Normally, the opto-electronic system also comprises collimating lenses and Fourier spatial filters. More specifically, in the emitter devices 22–25; 22', 22" and in the receiver devices 26–29; 26', 26" there can be integrated telecentric optics and in the receiver devices 26–29; 26', 26" lens stops for ensuring immunity from the influence of environmental light and light diffused by particles, fumes and vapor in suspension. However, for purposes of simplification, these components are not illustrated, as their use and associated functions are well known.

The apparatus can be equipped, in a known way, with a resident master piece, of known dimensions, for calibrating the measuring system.

Furthermore, it is possible to assemble the optical sources 22–25; 22', 22", the photosensitive devices 26–29; 26', 26" and, with reference to the second embodiment, the transversal slide 41 on a fixed support and workpiece 10 or crankshaft 10' on a longitudinal slide, in order to bring the various sections of the workpiece to the supporting location.

We claim:

1. Opto-electronic measuring apparatus for checking geometric features of a workpiece (10; 10') according to the shadow casting technique, including a first support (1; 1'), defining a supporting location for the workpiece, a second support (4; 4'), coupled with the first support, with two portions (33,34; 33',34') oppositely arranged with respect to said supporting location, a first generating system for generating optical radiations (22,23; 22') for providing a first beam of light with a section directed towards the workpiece, a first photosensitive linear system (28,29; 26') coupled to one (34; 34') of the two oppositely arranged portions for receiving said first beam after it is intercepted by the workpiece, a second generating system for generating optical radiations (24,25; 22") for providing a second beam of light with a section directed towards the workpiece, a second photosensitive linear system (26,27; 26") for receiving said second beam after it is intercepted by the workpiece, and detecting and control circuits (20,21; 20',21') connected to the first and the second photosensitive linear system (26–29; 26',26") and adapted to receive the signals from the first and second photosensitive linear system and to combine said signals for achieving a measurement of the workpiece in a single cross-section, characterized in that the second system for generating optical radiations (24,25; 22") is adapted for providing the second beam of light with a section directed towards the workpiece (10;10'), in an opposite direction with respect to that of said section of the first beam of light, and in that there are foreseen two beam splitter devices (30,31; 30',31'), each of said devices being connected to one of said oppositely arranged portions (33,34; 33',34'), and being adapted to receive both one and the other of said first and second beams, and to partially divert one of the beams towards the relevant photosensitive linear system (26–29), the second photosensitive linear system (26,27; 26") being coupled to the other (33; 33') of said two oppositely arranged portions, said two beam splitter devices (30,31; 30',31') being located between the first and second photosensitive linear system (26–29; 26") and said supporting location.

2. An apparatus according to claim 1, wherein said first and second generating systems (22–25; 22', 22") are connected to said two oppositely arranged portions (33, 34; 33', 34') and lie in planes transversal to the directions of said sections of the light beams, each beam splitter device (30, 31; 30', 31') being adapted to receive the radiations of one of the generating systems and partially divert them for providing the corresponding section directed towards the workpiece.

3. An apparatus according to claim 1, wherein the first and the second photosensitive linear systems (26–29; 26', 26") substantially lie in a transversal plane parallel to the directions of said sections of light beams and to a direction perpendicular to said directions of the beams, and are staggered with respect to each other in said perpendicular direction, for providing a single virtual photosensitive linear system.

4. An apparatus according to claim 3, wherein said photosensitive linear systems (26–29; 26") are spaced so as to provide a total measuring range substantially corresponding to the sum of their measuring ranges.

5. An apparatus according to claim 3 or claim 4, wherein said first and second generating systems (22–25; 22', 22") are arranged in a direction perpendicular to said transversal plane.

6. An apparatus according to one of claims 1 to 4 for checking geometric features of a workpiece (10,10'), defining a geometric axis, wherein said second support (4;4') is movable with respect to the first support (1;1') in a longitudinal direction, parallel to the geometric axis of the workpiece (10;10').

7. An apparatus to claim 6, comprising a position transducer (18;18') for detecting the mutual position of the first (5,6; 5',6') and second support (4,4').

8. An apparatus according to claims 1 to 4, wherein said first support (1;1') includes a live center (7;7') and a dead center (9;9'), for supporting and rotating the workpiece (10;10').

9. An apparatus according to claim 8, wherein said first support (5,6; 5',6') enables to adjust the position of said live center and dead center 7,9; 7',9') in order to support workpieces of different length.

10. An apparatus according to one of claims 1 to 4, including further generating systems (22–25; 22', 22") and further photosensitive linear systems (26–29; 26', 26").

11. An apparatus according to claim 10, wherein said first, second and further generating systems comprise optical sources (22–25; 22',22") of the infrared diode type (22–25; 22', 22") and said first, second and further photosensitive linear systems (26–29; 26',26") are of the CCD type.

12. An apparatus according to claim 1, wherein said second support includes at least one transversal slide (41), movable in a transversal direction, parallel to the direction of said sections of light beams, said first and second generating systems (22–25; 22', 22"), said first and second photosensitive linear system (26–29; 26', 26") and said two beam splitters (30, 31; 30', 31') being coupled to said transversal slide, said detecting and control circuits (20; 20') being adapted to control the translation of said transversal slide according to the transversal arrangement of the surfaces of the workpiece to be checked.

13. An apparatus according to claim 12, wherein said transversal slide (41) includes said two oppositely arranged portions (33,34; 33',34').

14. An apparatus according to claims 12 or 13, for checking geometric features of the crankpins of a crankshaft, defining a rotation axis, wherein said first support includes a live center (7') and a dead center (9') for supporting and rotating the crankshaft (10').

15. An apparatus according to one of claims 12 or 13, wherein said first, second and further generating systems comprise optical sources (22–25; 22',22") of the infrared diode type (22–25; 22', 22") and said first, second and further photosensitive linear systems (26–29; 26',26") are of the CCD type.

\* \* \* \* \*

UNITED STATES PATENT AND TRADEMARK OFFICE
CERTIFICATE OF CORRECTION

PATENT NO : 5,841,542
DATED : November 24, 1998
INVENTOR(S) : Milana et al.

It is certified that error appears in the above-identified patent and that said Letters Patent is hereby corrected as shown below:

On the title page, in item [56] References Cited,

Under subheading OTHER PUBLICATIONS:

"See 1 in Addendum." should read
--A. Pietra et al., "The Optoflex for Shaft Gauging" published by ISATA - In Pursuit of Technical Excellence - 28th International Symposium on Automotive Technology and Automation promoted by Mercedes-Benz AG, 18th-22nd September 1995, Stuttgart, Germany - Proceedings for the Dedicated Conference on Total Quality Management in the Automotive Industries, pp. 265-274.--.

UNITED STATES PATENT AND TRADEMARK OFFICE
CERTIFICATE OF CORRECTION

PATENT NO. : 5,841,542
DATED : November 24, 1998
INVENTOR(S) : Milana et al.

It is certified that error appears in the above-identified patent and that said Letters Patent is hereby corrected as shown below:

Column 10

Claim 7, line 1, insert --according-- after "apparatus".

Claim 9, line 3, cancel "7,9; 7',9')", substitute --(7,9; 7',9')--.

Signed and Sealed this

Thirteenth Day of April, 1999

Attest:

Q. TODD DICKINSON

Attesting Officer

Acting Commissioner of Patents and Trademarks